W. A. CALDWELL.

VENTILATED GRAIN CRIB STAVE.

APPLICATION FILED MAR. 21, 1921.

Reissued Nov. 1, 1921. 15,217

2 SHEETS—SHEET 1.

INVENTOR
Warren A. Caldwell
By Jeffs and Jeffs
Att'ys.

W. A. CALDWELL.
VENTILATED GRAIN CRIB STAVE.
APPLICATION FILED MAR. 21, 1921.
Reissued Nov. 1, 1921. 15,217.
2 SHEETS—SHEET 2.
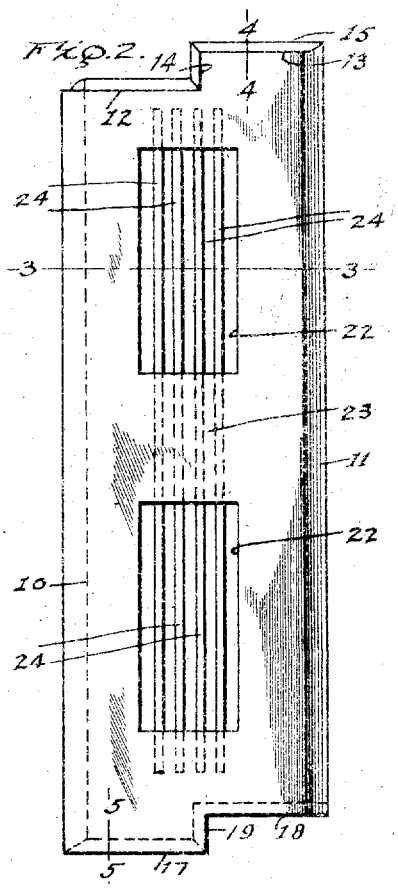
INVENTOR
Warren A. Caldwell
By Jeffs and Jeffs
ATTYS

UNITED STATES PATENT OFFICE.

WARREN A. CALDWELL, OF OSKALOOSA, IOWA, ASSIGNOR TO CALDWELL SILO COMPANY, INC., OF OSKALOOSA, IOWA, A CORPORATION OF IOWA.

VENTILATED GRAIN-CRIB STAVE.

Specification of Reissued Letters Patent. Reissued Nov. 1, 1921.

15,217.

Original No. 1,298,174, dated March 25, 1919, Serial No. 233,518, filed May 9, 1918. Application for reissue filed March 21, 1921. Serial No. 454,230.

*To all whom it may concern:*

Be it known that I, WARREN A. CALDWELL, a citizen of the United States, residing at Oskaloosa, in the county of Mahaska and State of Iowa, have invented new and useful Improvements in Ventilated Grain-Crib Staves, of which the following is a specification.

The invention relates to an improved grain-crib stave and has for its primary object to provide a structure having one or more ventilating openings therein with a metal grating extending across the opening or openings and constituting reinforcing means for the stave.

A further object of the invention is to provide a stave wherein the grating is formed by reinforcing bars adapted not only to prevent waste of any stored material through the ventilating openings of the stave but also adapted to prevent the entrance of rodents through the said openings.

And the invention has as a still further object to provide a stave so constructed that the ventilating openings may be formed therein at the time the stave is molded.

Other and incidental objects will appear as the description proceeds. In the drawings wherein I have illustrated the preferred embodiment of the invention, and wherein similar reference characters designate corresponding parts thoughout the several views:

Fig. 2 is a side elevation showing one of the staves of the structure in detail and particularly illustrating the ventilating openings therein as well as the disposition of the reinforcing bars for the stave to form gratings at the openings.

Figure 1:
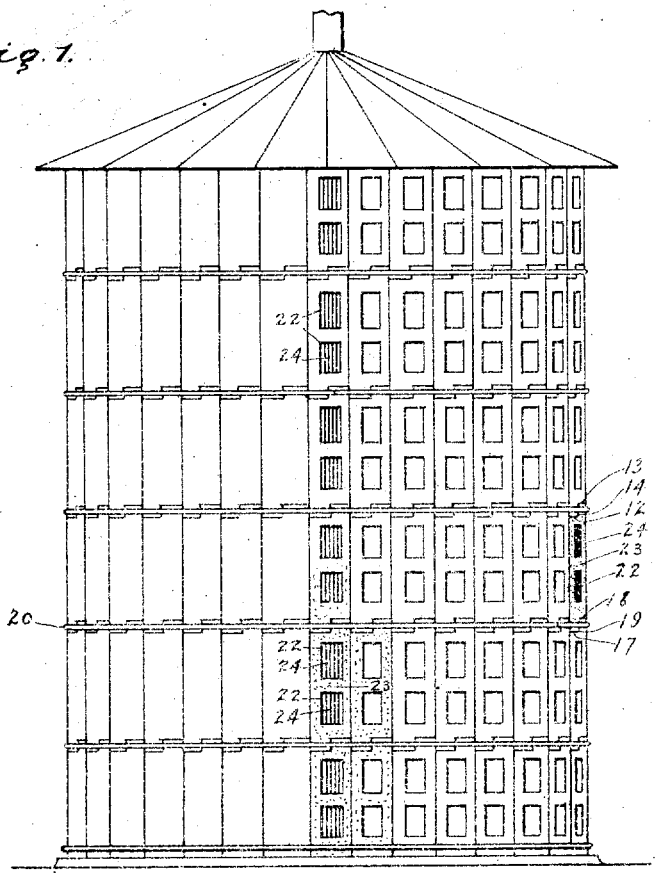
Figure 1 is a side elevation showing a grain bin constructed of my improved staves.

Referring now more particularly to the drawings, I have, in Fig. 1, shown a crib constructed of my improved staves. A stave of the design shown particularly in Fig. 2 is employed and in the construction of the crib the said staves are arranged in courses built successively upon each other. However, it should in this connection be observed that the outer end edges of the staves forming the top and bottom courses of the structure are straight so that the bottom course may rest flat upon a suitable foundation while a roof of approved character may be erected upon the top course.

Figure 3:
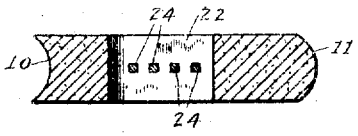
Fig. 3 is a transverse sectional view taken on the line 3—3 of Fig. 2, this view particularly showing the disposition of the reinforcing bars medially of the stave.

The stave of the present invention is, in its general form, somewhat similar to an ordinary barrel stave in that its length is substantially greater than its breadth and it is comparatively thin. It differs substantially from the ordinary building block which usually is of substantial thickness and the length of which is ordinarily approximately the same as its breadth. The stave is illustrated in detail in Figs. 2 and 3. This stave is preferably oblong in outline and is formed of concrete or other similar material. The longitudinal edges of the stave are respectively concave and convex, as indicated at 10 and 11, the concave edge of one stave being adapted to receive the convex edge of an adjacent stave so that the longitudinal edges of abutting staves will interfit. At its ends the stave is reversely offset so that the ends of the staves of one course of a structure erected therefrom will, as shown in Fig. 1, match with and overlap the abutting ends of the staves of a superposed course. Transverse offset edge portions 12 and 13 respectively are thus defined at one end of the stave. These edge portions are approximately of equal length and are joined medially of the staves by a longitudinal portion or shoulder 14. As shown these several portions are provided with a continuous medial rib 15 terminating in spaced relation to the side faces of the stave to define flat marginal end faces. At its opposite end the stave is formed with transverse offset edge portions 17 and 18 respectively corresponding to the edge portions 12 and 13 at the other end of the stave and joined at their inner extremities by a medial longitudinal edge portion or shoulder 19 corresponding to the shoulder 14. Formed in the edge portions 17, 18 and 19 is a continuous medial groove adapted to receive the rib 15 of an abutting stave and defining flat marginal end faces. Thus, it will be seen that in the erection of a structure as shown in Fig. 1, the grooves of the staves of one course will receive the ribs 15 of the staves of a subjacent course so that the staves will thus interfit in overlapping relation at their ends while the flat end faces of the staves will abut for sustaining the major portion of the load of the staves and thus prevent undue lateral strain within the channels. It will therefore be seen that the staves of the several courses will coact to provide a rigid structure since the staves will interlock at their meeting edges. Surrounding the overlapping end portions of the staves at the junction of the courses thereof are suitable hoops 20′ adapted to bind the staves of the several courses together and rigidly brace the structure against expansion under the influence of internal pressure set up when the crib is filled.

In order that the crib may be formed for properly ventilating or drying out its contents, I construct the stave of the present invention with ventilating openings 22. The number of openings employed in each stave may, of course, be varied as desired, but I preferably form the stave with two of the said openings spaced medially of the stave to extend longitudinally thereof. An intermediate web 23 is thus defined between the inner ends of the said openings. Embedded within the stave medially thereof to extend across the ventilating openings is a plurality of rigid reinforcing rods or bars 24 which are arranged substantially parallel to each other to extend longitudinally of the stave. These reinforcing bars thus extend medially through the web 23 for bracing the said web and at their end portions project beyond the outer ends of the ventilating openings into the body of the stave so that the said bars will thus also longitudinally reinforce the stave. At the same time, these bars will, as will now be clear, form gratings across the ventilating openings adapted to retain the contents of the crib so that wasting thereof will be avoided while a free circulation of air through the ventilating openings will be permitted for properly ventilating or drying out the contents of the crib. Furthermore, by spacing the reinforcing bars closely together, the gratings will prevent the entrance of rodents into the crib.

What I claim is:

1. A ventilated grain crib stave including an elongated body portion having spaced openings formed therein and extending in the direction of the length of the stave and opening through the opposite side faces thereof, said openings defining an intermediate connecting web, and a plurality of rigid reinforcing bars having their intermediate portions extending through the connecting web and their opposite ends extended across said openings and embedded in the body portion to form a grating.

2. A ventilated grain crib stave including a solid elongated body portion having spaced openings formed therein medially of the stave and extending in the direction of the length thereof and opening through the opposite side faces of said stave, said openings defining an intermediate connecting web, and a plurality of laterally spaced rigid reinforcing bars having their intermediate portions extending through the connecting web at the center thereof and their opposite ends extended across said openings and embedded in the body portion to form a grating.

3. A ventilated grain crib stave including a solid elongated body portion having substantially rectangular openings formed therein and extending in the direction of the length of the stave and opening through the opposite side faces thereof, the outer walls of said openings terminating short of the adjacent ends of the staves and the inner walls of said openings being spaced apart to form an intermediate connecting web, and a plurality of laterally spaced rigid longitudinal reinforcing rods having their intermediate portions embedded in and extended through the connecting web at substantially the center thereof and their opposite ends extended across said openings with the terminals of the rods embedded in the body portion between the outer walls of the openings and the adjacent ends of the stave.

4. A stave for grain crib construction having an elongated comparatively thin and narrow body provided with a ventilating opening extending transversely therethrough from one side face to the other, and a metal grating extending across said opening and embedded a substantial distance in the material of the stave to thereby reinforce said stave, said grating being of sufficient strength to resist without rupture the internal pressure of grain and to prevent the entrance of rodents.

5. A stave for grain crib construction having an elongated comparatively thin and narrow body provided with a ventilating opening extending transversely therethrough from one side face to the other, and a plurality of rigid rods extending across said opening and having their ends embedded a substantial distance in the material of the stave to thereby reinforce said stave.

6. A stave for grain crib construction having an elongated comparatively thin and narrow body provided with a ventilating opening extending transversely therethrough from one side face to the other, and a plurality of bars extending longitudinally of said stave and across said opening and having their ends embedded in the material of said stave, said bars constituting reinforcing means for said stave and a grating for said opening.

7. A stave for grain crib construction having an elongated comparatively thin and narrow body provided with a ventilating opening extending transversely therethrough from one side face to the other, said stave having grating members extending across said opening and of sufficient strength to resist without rupture the internal pressure of grain and to prevent entry of rodents.

WARREN A. CALDWELL.